US009471108B2

(12) United States Patent
Dong

(10) Patent No.: US 9,471,108 B2
(45) Date of Patent: Oct. 18, 2016

(54) ELECTRONIC DEVICE

(71) Applicant: LENOVO (BEIJING) LIMITED, Beijing (CN)

(72) Inventor: Shujie Dong, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 95 days.

(21) Appl. No.: 14/228,935

(22) Filed: Mar. 28, 2014

(65) Prior Publication Data
US 2015/0085436 A1 Mar. 26, 2015

(30) Foreign Application Priority Data

Sep. 26, 2013 (CN) .......................... 2013 1 0446256
Sep. 27, 2013 (CN) .......................... 2013 1 0452863

(51) Int. Cl.
*H05K 7/00* (2006.01)
*H05K 5/00* (2006.01)
*G06F 1/16* (2006.01)

(52) U.S. Cl.
CPC .................... *G06F 1/166* (2013.01)

(58) Field of Classification Search
CPC ..................................................... F16M 13/00
USPC ....................................... 361/679.01–679.03
See application file for complete search history.

(56) References Cited

U.S. PATENT DOCUMENTS 6,016,248 A * 1/2000 Anzai ................... G06F 1/1626
248/463
2009/0152432 A1* 6/2009 Kunii ..................... F16M 11/10
248/398
2012/0033363 A1 2/2012 Yeh

FOREIGN PATENT DOCUMENTS

| CN | 101853610 A | 10/2010 |
| CN | 201964096 u | 9/2011 |
| CN | 201984791 U | 9/2011 |
| CN | 202327552 U | 7/2012 |
| CN | 202852370 U | 4/2013 |
| CN | 103162078 A | 6/2013 |
| CN | 203480378 U | 3/2014 |
| DE | 20 2007 007 329 U1 | 9/2007 |
| JP | 2002-275127 A | 9/2002 |

* cited by examiner

*Primary Examiner* — Jerry Wu
(74) *Attorney, Agent, or Firm* — Scully Scott Murphy & Presser

(57) ABSTRACT

The present invention discloses an electronic device comprising: a body comprising a display screen exposed on a first surface of the body; a connector arranged on a second surface of the body, the second surface being opposite to the first surface; an operational posture switching unit connected to the body by the connector. The unit has a first working position and a second working position and is switchable between the first working position and the second working position. The electronic device is in a first operational posture when the unit is located in the first working position while the electronic device is in a second operational posture which is different from the first operational posture when the unit is located in the second working position. The operational posture switching unit allows the body in different operational postures to improve the user's experiences.

17 Claims, 11 Drawing Sheets

ELECTRONIC DEVICE

CROSS-REFERENCE TO RELATED APPLICATION

This application claims the benefit of Chinese Patent Applications Nos. 201310446256.0 filed on Sep. 26, 2013 and 201310452863.8 filed on Sep. 27, 2013 in the State Intellectual Property Office of China, the disclosures of which are incorporated herein by reference.

BACKGROUND OF THE INVENTION

1. Field of the Invention

The present invention relates to a terminal device, in particular to an electronic device.

2. Description of the Related Art

At present, an amount of electronic devices is increasing by geometric progression. The electronic devices have become one of necessities in everyday lives for the people. Due to requirements to portability of the electronic devices, miniaturization for them has become a trend in development. A portable electronic device is convenient to carry, however, in use, it may almost be arranged only in one posture, i.e., lain flat, as it is not provided with associated assistant components. A user will not keep it stably upon using it unless it is held by pair of hands or other supports. It may cause a bad user experience for the portable electronic device.

Further, there is still a problem if the electronic device may be used only in a supported posture. In some special circumstances, for example, when the user is on the treadmill, on the bicycle, in the car or in the bed, the electronic device will not provide a good vision effect to the user due to a limited view if it is kept only in the supported posture.

Thus, the electronic device in the single posture cannot provide an improved user experience.

SUMMARY OF THE INVENTION

In view of this, an object of the present invention is to provide an electronic device which has different operational postures to improve the user's experiences.

In order to achieve the above object, the embodiments of the present invention may be implemented as follows.

In accordance with an aspect, it provides an electronic device comprising:

a body comprising a display screen exposed on a first surface of the body;

a connector arranged on a second surface of the body, the second surface being opposite to the first surface;

an operational posture switching unit connected to the body by the connector, wherein the operational posture switching unit has a first working position and a second working position and is switchable between the first working position and the second working position, and wherein the electronic device is in a first operational posture when the operational posture switching unit is located in the first working position, whereas the electronic device is in a second operational posture which is different from the first operational posture when the operational posture switching unit is located in the second working position.

In an embodiment, the operational posture switching unit further may have a third working position, wherein the electronic device is in a third operational posture when the operational posture switching unit is located in the third working position.

In an embodiment, the connector may comprise a first connecting member and a second connecting member; and the operational posture switching unit comprises:

a hanging part arranged at a first location on the second surface of the body by the first connecting member;

a support part arranged at a second location on the second surface of the body by the second connecting member, wherein in the first working position of the operational posture switching unit, the electronic device is hung at a first bearing device by the hanging part and is in the first operational posture;

in the second working position of the operational posture switching unit, the electronic device is supported at a second bearing device by the support part and is in the second operational posture.

In an embodiment, when the hanging part and the support part are locked to each other, the electronic device is in the third operational posture.

In an embodiment, the first location and the second location may have same parameters, and when the hanging part and the support part are locked to each other, the locked hanging part and the locked support part form an appearance of the electronic device and are used as decoration parts in appearance.

In an embodiment, the hanging part may be unfolded by the first connecting member to a first angle with respect to the body; the support part is unfolded by the second connecting member to a second angle with respect to the body;

when the electronic device is in the first operational posture, the hanging part is located in a first relative position with respect to the body by the first connecting member while the support part is located in a second relative position with respect to the body by the second connecting member;

when the electronic device is in the second operational posture, the support part is located in a first relative position or the second relative position with respect to the body by the second connecting member while the hanging part is located in a second relative position with respect to the body by the first connecting member;

wherein the first relative position in which the hanging part is located with respect to the body by the first connecting member is an unfolded position of the hanging part and the second relative position in which the hanging part is located with respect to the body by the first connecting member is a retracted position of the hanging part;

wherein the first relative position in which the support part is located with respect to the body by the second connecting member is an unfolded position of the support part and the second relative position in which the support part is located with respect to the body by the second connecting member is a retracted position of the support part.

In an embodiment, the body of the electronic device further may comprise:

a sensor configured to obtain sensed parameters for determining the operational postures of the electronic device and a processor configured:

to control the electronic device to operate in a first working mode which is adapted to the first operational posture when the electronic device is in the first operational posture;

to control the electronic device to operate in a second working mode which is adapted to the second operational posture when the electronic device is in the second operational posture; and to control the electronic device to operate in a third working mode which is adapted to the third operational posture when the electronic device is in the third operational posture.

In an embodiment, a first accommodating portion which corresponds to the first location and accommodates the hanging part may be provided on the second surface of the body; and a second accommodating portion which corresponds to the second location and accommodates the support part is provided on the second surface of the body, wherein the first accommodating portion and the second accommodating portion are formed integrally.

In an embodiment, when the hanging part and the support part are accommodated in the first accommodating portion and the second accommodating portion respectively, the hanging part and the support part are locked and connected to each other; wherein the circumstance that the hanging part and the support part are locked and connected to each other comprises:

the hanging part and the support part are connected by a button and an eye, or the hanging part and the support part are connected by a slot and a clasp, or.

the hanging part and the support part are connected by a screw and a nut.

In an embodiment, the hanging part may comprise a suspender and a first pivot, wherein the suspender is connected to the first pivot and rotatable about it, the suspender being a hook or a ring.

In an embodiment, the support part may comprise a second pivot and a supporter to support the terminal or the electronic device, wherein the supporter is connected to the second pivot and rotatable about it, the supporter being a linear type supporter, a double folded type supporter or a triangular type supporter.

In an embodiment, the double folded type supporter may be folded to form the linear type supporter.

The triangular type supporter is folded to form the double folded type supporter or the linear type supporter.

In an embodiment, the operational posture switching unit may comprise a supporting member, wherein the supporting member is connected to the body by the connector and is rotatable about the connector as a rotation center via the connector; and wherein in the first working position of the operational posture switching unit, the supporting member is rotated about the rotation center via the connector to a first predetermined angle and the electronic device is in the first operational posture;

in the second working position of the operational posture switching unit, the supporting member is rotated about the rotation center via the connector to a second predetermined angle and the electronic device is in the second operational posture.

In an embodiment, the supporting member may comprise a connecting part and a main part which form the shape of the supporting member, wherein the supporting member contacts with the second surface of the body completely when the supporting member is rotated about the rotation center via the connector to the first predetermined angle.

In an embodiment, the body may have a connecting boss, wherein the connecting boss has a first face on which the connector is arranged and which is connected to the connecting part of the supporting member by the connector; and wherein the first face of the connecting boss is arranged at an angle β to the second surface of the body, the angle β being approximately equal to an angle α which is formed between the connecting part of the supporting member and the main part of the supporting member.

In an embodiment, the main part of the supporting member may have a hanging portion arranged at an end of the main part, the main part having a length L;

wherein the length L of the main part is greater than a vertical distance from a first edge of the second surface to an intersection line of the first face of the connecting boss with the second surface thereof, such that the hanging portion of the main part is exposed beyond the first edge of the second surface of the body when the supporting member is rotated about the rotation center to the second predetermined angle via the connector and the electronic device is in the second operational posture.

In an embodiment, the body further may comprise:

a sensor configured to obtain sensed parameters for determining the operational postures of the electronic device; and/or a processor configured:

to control the electronic device to operate in a first working mode when the electronic device is in the first operational posture;

to control the electronic device to operate in a second working mode when the electronic device is in the second operational posture.

In an embodiment, the angle β may be greater than 90 degrees.

In an embodiment, the hanging portion may be provided with a hook or a ring.

In the electronic device according to the embodiments of the present invention, by means of the operational posture switching unit, the body of the electronic device may be in different operational postures, for example, in the support operational posture or in the hung operational posture, such that within various environments, the user can switch flexibly the operational postures in which the body of the electronic device is located. It has a simple operation, strong practicability and improves the user's experiences.

Furthermore, in the embodiments of the present invention using the hanging part and the support part as the operational posture switching unit, the electronic device may in practice be in the operational postures required for the user by adjusting the postures of the hanging part and the support part, such that the user, upon using the electronic device, for example surfing in the internet or watching videos by the electronic device, may not hold it all along, but support or hang it at other bearing devices to allow the electronic device to be used conveniently. In addition, by providing an accommodating portion for the hanging part and the support part on the body of the electronic device, the support part and the hanging part may be retracted in the accommodating portion, in the case that they are not used. In this circumstance, the retracted hanging part and support part form decoration parts of the electronic device along with the accommodating portion so as to achieve the function of decorating the electronic device and to improve the user's experiences in appearance of the electronic device.

BRIEF DESCRIPTION OF THE DRAWINGS

These and other aspects as well as advantages of the present invention will become apparent and readily understood from the description of the preferred embodiments taking in conjunction with the accompanying drawings, in which.

DETAILED DESCRIPTION OF THE EMBODIMENTS

Figure 1:
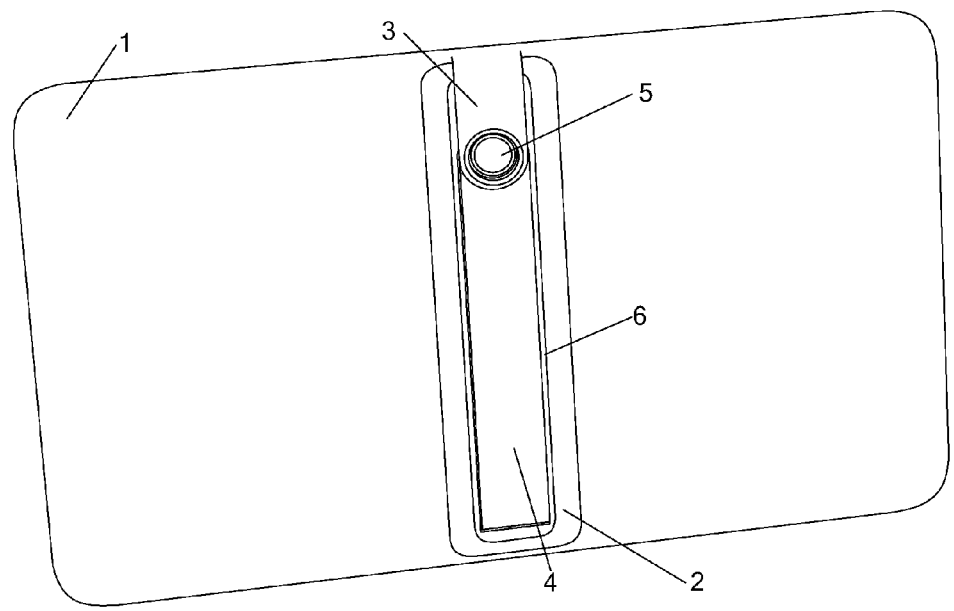
FIG. 1 is a schematic view showing an assembled structure of an electronic device according to a first example of an implementation of the present invention.

Technical solutions of the present invention will be described hereinafter in more detail by the way of embodiment with reference to figures of the attached drawings, wherein the same or like reference numerals refer to the same or like elements throughout the specification. The explanation to the embodiment of the present invention with referring to the accompanying drawings is intended to interpret the general inventive concept of the present invention, rather than being construed as a limiting to the present invention. Please be noted that where appropriate, embodiments of the present application and features therein can be combined in any manner.

An electronic device according to an embodiment of the present application comprises:

a body comprising a display screen exposed on a first surface of the body;

a connector arranged on a second surface of the body, the second surface being opposite to the first surface;

an operational posture switching unit connected to the body by the connector, wherein the operational posture switching unit has a first working position and a second working position and is switchable between the first working position and the second working position, and wherein the electronic device is in a first operational posture when the operational posture switching unit is located in the first working position while the electronic device is in a second operational posture which is different from the first operational posture when the operational posture switching unit is located in the second working position.

The operational posture switching unit may be a mechanical structure which can provide the electronic device with at least two different operational postures and can switch the electronic device among the different operational postures. The operational posture switching unit has at least the first working position and the second working position which correspond to the first operational posture and the second operational posture of the electronic device respectively.

Herein, the first operational posture typically means a hung posture in which the electronic device may be hung on a wall, of course, may be hung at fingers of the user to be easily carried. The second operational posture typically means a supported posture in which the electronic device may be supported on a surface of an object such as desktop by a supporting part or holder to perform the desired operations, for example, watching videos on the electronic device.

In the embodiments of the present invention, the operational postures of the electronic device are not limited to the two operational postures as described above. For example, in an embodiment, the operational posture switching unit may further have a third working position. When it is located in the third working position, the electronic device is in a third operational posture, for example the flat posture.

In an implementation, the connector comprises a first connecting member and a second connecting member; and the operational posture switching unit comprises:

a hanging part arranged at a first location on the second surface of the body by the first connecting member;

a support part arranged at a second location on the second surface of the body by the second connecting member, wherein in the first working position of the operational posture switching unit, the electronic device is hung by the hanging part, at a first bearing device, for example a hook or fingers of the user, and is in the first operational posture;

in the second working position of the operational posture switching unit, the electronic device is supported by the support part at a second bearing device, for example an object such as a desk, and is in the second operational posture.

Herein, the first connecting member may be an elastic member such as an elastic slice, or may be a pivot or the like. As such, the second connecting member may be an elastic member such as an elastic slice, or may be a pivot or the like.

In the above implementation, the switching of the operational postures of the electronic device is achieved by changing the positions of the support part and the hanging part.

In the embodiments of the present invention, an accommodating portion which accommodates the hanging part and the support part, is further provided on the second surface of the body of the electronic device. The accommodating portion is generally parallel to a connection line between the first location and the second location. The connection line between the first location and the second location may be parallel to a certain side of the electronic device, or may be arranged at a certain angle to the side of the electronic device to improve decoration effects of an appearance of the electronic device.

In the embodiments of the present invention, the electronic device generally refers to a portable electronic device such as a tablet PC, for example may be a pad, a game device, a netbook or a player.

In the embodiments of the present invention, when the hanging part and the support part are locked to each other, the electronic device is in the third operational posture.

Herein, the third operational posture is the flat posture, i.e., in which the hanging part and the support part are retracted. The feature that the hanging part and the support part are locked and connected to each other means: the hanging part and the support part are connected by fasteners such as posts or snap fasteners arranged on the second surface of the body of the electronic device; of course, the hanging part and the support part may be connected by being adsorbed to each other; and it also may mean that the hanging part is locked in itself and the support part is locked in itself. For example, the hanging part is locked in itself by an frictional force between the electronic device and the first connecting member connected to the second surface of the body of the electronic device; and the support part is locked in itself by an frictional force between the electronic device and the second connecting member connected to the second surface of the body of the electronic device. Or the hanging part is locked in itself by adsorption force between it and the second surface of the electronic device, and the support part is locked in itself by adsorption force between it and the second surface of the electronic device.

In the embodiments of the present invention, the first location and the second location have same parameters. For example, a coordinate system is established on basis of a point on the second surface of the electronic device, and the first location and the second location may have same X values or Y values, that is, the connection line between the first location and the second location may be parallel to the side of the second surface of the electronic device. When the hanging part and the support part are locked to each other, the locked hanging part and the locked support part form an appearance of the electronic device and are used as decoration parts in appearance.

In the embodiments of the present invention, an accommodating portion which accommodates the hanging part and the support part is further provided on the second surface of the body of the electronic device. The accommodating portion is generally parallel to the connection line between the first location and the second location to allow the hanging part and the support part to be retracted easily.

As a preferred embodiment, the connection line between the first location and the second location is parallel to the side of the electronic device. However, in order to better improve the decoration effects of the appearance of the electronic device, the connection line between the first location and the second location may be arranged at a certain angle to the side of the electronic device.

The hanging part is unfolded by the first connecting member to a first angle with respect to the body;

the support part is unfolded by the second connecting member to a second angle with respect to the body;

when the electronic device is in the first operational posture, the hanging part is located in a first relative position with respect to the body by the first connecting member while the support part is located in a second relative position with respect to the body by the second connecting member; or the hanging part is located in a first relative position with respect to the body by the first connecting member while the support part is located in a third relative position with respect to the body by the second connecting member, for example, when the hanging part is hung at a hook in the wall, the support part is unfolded to a certain angle such that the body is parallel to the wall.

When the electronic device is in the second operational posture, the support part is located in a first relative position with respect to the body by the second connecting member while the hanging part is located in a second relative position with respect to the body by the first connecting member; herein, the first relative position has a plurality of angles to meet the requirements for different support means of the electronic device.

When the electronic device is in the second operational posture, the support part is located in the second relative position with respect to the body by the second connecting member while the hanging part is located in the second relative position with respect to the body by the first connecting member.

The first relative position in which the hanging part is located with respect to the body by the first connecting member is an unfolded position of the hanging part; and the second relative position in which the hanging part is located with respect to the body by the first connecting member is a retracted position of the hanging part.

The first relative position in which the support part is located with respect to the body by the second connecting member is an unfolded position of the support part; and the second relative position in which the support part is located with respect to the body by the second connecting member is a retracted position of the support part.

In the embodiments of the present invention, typically, when the support part is unfolded, the hanging part is retracted; otherwise, when the hanging part is unfolded, the support part is retracted.

In an embodiment of the present invention, the body of the electronic device further comprises a sensor and a processor.

The sensor is configured to obtain sensed parameters for determining the operational posture of the electronic device.

The processor is configured to control the electronic device to operate in a first working mode which is adapted to the first operational posture, when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture, when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture, when the electronic device is in the third operational posture, for example, a third display interface which is adapted to the third operational posture is displayed on the display screen, such as multi-person, multi-orientation interactive interfaces; or the system of the electronic device is switched to a mode of smart device.

As a preferred embodiment, a first accommodating portion which corresponds to the first location and accommodates the hanging part is provided on the second surface of the body;

a second accommodating portion which corresponds to the second location and accommodates the support part is provided on the second surface of the body;

the first accommodating portion and the second accommodating portion are formed integrally.

In the embodiment of the present invention, for the sake of decorating the electronic device, typically, the first accommodating portion and the second accommodating portion are formed integrally. In this way, when the hanging part and the support part are retracted, they may be connected to each other to allow the electronic device to be carried conveniently. The posture in which the hanging part and the support part are retracted is the third operational posture.

Specifically, when the hanging part and the support part are accommodated in the first accommodating portion and the second accommodating portion respectively, the hanging part and the support part are locked and connected to each other; wherein the circumstance that the hanging part and the support part are locked and connected to each other comprises:

the hanging part and the support part are connected by buttons and eyes, or the hanging part and the support part are connected by a slot and a clasp, or.

the hanging part and the support part are connected by a screw and a nut.

As a preferred embodiment, the hanging part comprises a suspender and a first pivot, and the suspender is connected to the first pivot and rotatable about it, the suspender being a hook or a ring.

As a preferred embodiment, the support part comprises a second pivot and a supporter to support the terminal, and the supporter is connected to the second pivot and rotatable about it, the supporter being a linear type supporter, a double folded type supporter or a triangular type supporter.

As a preferred embodiment, the double folded type supporter is folded to form the linear type supporter;

the triangular type supporter is folded to form the double folded type supporter or the linear type supporter.

The substantive concept of the present invention will be further explained below on basis of the applications of the electronic device according to the embodiments of the present invention.

FIG. 1 is a schematic view showing an assembled structure of an electronic device according to a first example of an implementation of the present invention. As illustrated in FIG. 1, the electronic device according to the example comprises: a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to the side of the electronic device. However, in order to improve the decoration effects of the appearance of the electronic device, the connection line between the first location and the second location may be arranged at a certain angle to the side of the electronic device.

In an embodiment of the present invention, the body of the electronic device further comprises a sensor and a processor, wherein the sensor is configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

In the embodiment shown in FIG. 1, the hanging part 3 and the support part 4 are retracted in the accommodating portion 6, which in particular, may be a strip-like protrusion. An accommodating groove for receiving the hanging part 3 and the support part 4 is provided in the middle of the protrusion to form the accommodating portion 6.

The hanging part 3 is accommodated into one end of the accommodating portion 6 and the support part 4 is accommodated into the other end of the accommodating portion 6.

When the hanging part 3 and the support part 4 are accommodated within the accommodating portion 6, the hanging part 3 is fastened, by means of a hanging hole arranged at its end, in a fastener 5 such as posts or snap fasteners in the accommodating portion 6 to be fixed and fitted to the second surface of the electronic device. Likewise, the support part 4 may also be fastened on the posts or snap fasteners or the like to be fixed and fitted to the second surface of the electronic device.

The lengths of the hanging part 3 and the support part 4 may be provided as requirements in practice.

The hanging part 3 may be connected to the second surface of the electronic device by an elastic slice or a pivot.

As such, the support part 4 may also be connected to the second surface of the electronic device by an elastic slice or a pivot.

Figure 2:
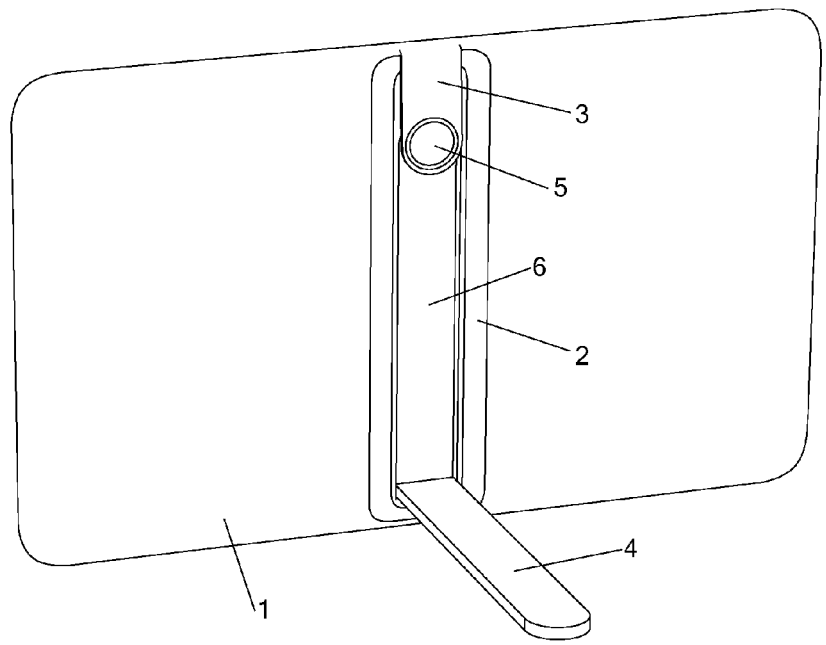
FIG. 2 is a schematic view showing an assembled structure of an electronic device according to a second example of an implementation of the present invention.

FIG. 2 is a schematic view showing an assembled structure of an electronic device according to a second example of an implementation of the present invention. As illustrated in FIG. 2, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to the side of the electronic device. However, in order to improve the decoration effects of the appearance of the electronic device, the connection line between the first location and the second location may be arranged at a certain angle to the side of the electronic device.

In an embodiment of the present invention, the body of the electronic device further comprises a sensor and a processor, wherein the sensor is configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

As shown in FIG. 2, the support part 4 may be unfolded along the second connecting member, and thus the electronic device may be supported by the support part 4 to be rested on a bearing device such as a desktop stably. The user may watch video or play games facing the display screen of the electronic device without holding the electronic device all along.

Since the electronic device is not necessary to be hung at that time, the hanging part 3 is retracted.

Figure 3:
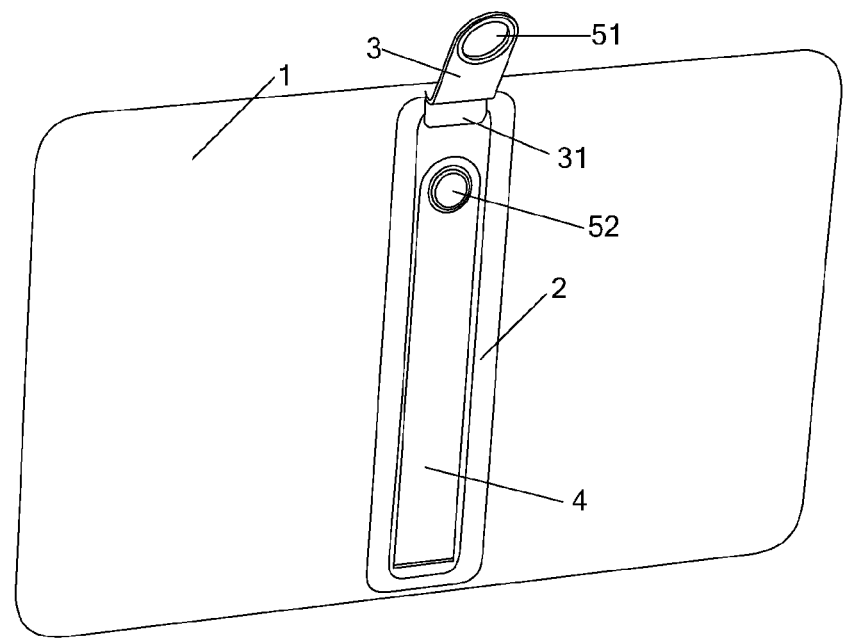
FIG. 3 is a schematic view showing an assembled structure of an electronic device according to a third example of an implementation of the present invention.

FIG. 3 is a schematic view showing an assembled structure of an electronic device according to a third example of an implementation of the present invention. As illustrated in FIG. 3, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to a side of the electronic device. However, in order to improve the effects of decorating the appearance of the electronic device, the connection line between the first location and the second location may be arranged at a certain angle to the side of the electronic device.

In an embodiment of the present invention, the body of the electronic device further comprises a processor and a sensor configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

As shown in FIG. 3, if it is desired to hang the electronic device on the hook or the fingers of the user, the hanging part 3 will be unfolded and the support part 4 will be retracted.

As a preferred embodiment, a hole 51 receiving the fastener 5 is provided at a free end of the hanging part 3. The hanging part 3 is arranged onto the fastener 5 by the hole 51 and fixed by the frictional force between the hole 51 and the fastener 5. Likewise, a hole 52 receiving the fastener 5 is provided at a free end of the support part 4. The support part 4 is arranged onto the fastener 5 by the hole 52 and fixed by the frictional force between the hole 52 and the fastener 5.

Figure 4:
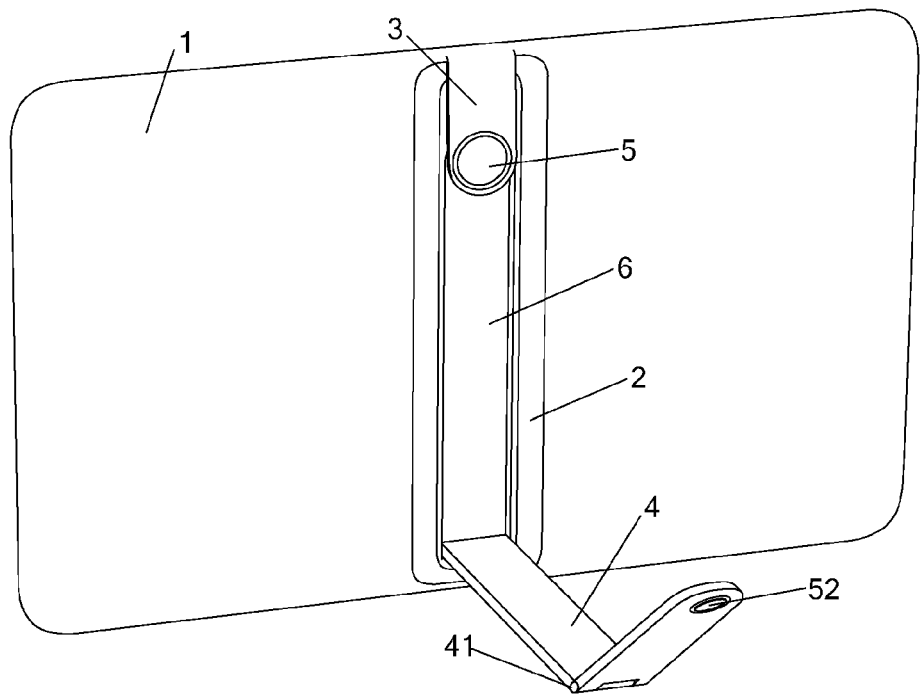
FIG. 4 is a schematic view showing an assembled structure of an electronic device according to a fourth example of an implementation of the present invention.

FIG. 4 is a schematic view showing an assembled structure of an electronic device according to a fourth example of an implementation of the present invention. As illustrated in FIG. 4, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to a side of the electronic device. However, in order to improve the effects of decorating the appearance of the electronic device, the connection line between the first location and the second location may be arranged at a certain angle to the side of the electronic device.

In an embodiment of the present invention, the body of the electronic device further comprises a processor and a sensor configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

As illustrated in FIG. 4, the support part 4 is also in a foldable form, which has two portions connected by a pivot 41. In this way, when the electronic device is needed to be supported, it may use the foldable construction to improve the support of the electronic device.

Figure 5:
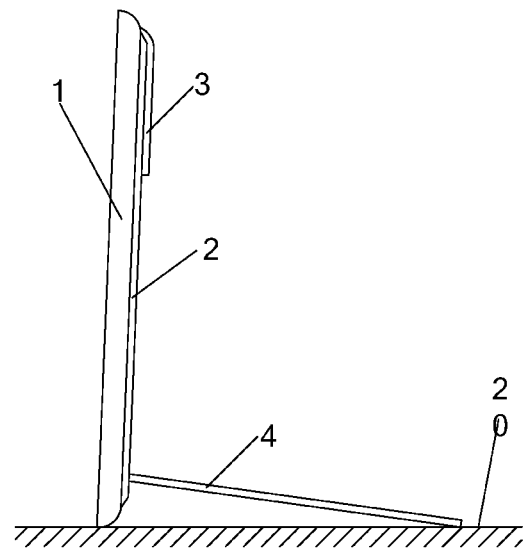
FIG. 5 is a schematic view showing an assembled structure of an electronic device according to a fifth example of an implementation of the present invention.

FIG. 5 is a schematic view showing an assembled structure of an electronic device according to a fifth example of an implementation of the present invention. As illustrated in FIG. 5, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to a side of the electronic device. However, in order to improve the effects of decorating the appearance of the electronic device, the connection line between the first location and the second location may be arranged at a certain angle to the side of the electronic device.

In an embodiment of the present invention, the body of the electronic device further comprises a processor and a sensor configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

As shown in FIG. 5, when the user does not want to hold the electronic device, the support part 4 is unfolded from the accommodating portion 2. The electronic device may be supported stably with the free end of the support part 4 being borne against the bearing device such as a desk 20.

Figure 6:
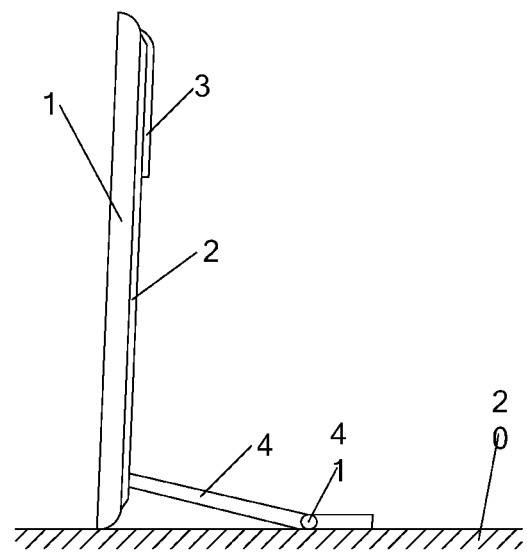
FIG. 6 is a schematic view showing the assembled structure of an electronic device according to the sixth example of an implementation of the present invention.

FIG. 6 is a schematic view showing an assembled structure of an electronic device according to a sixth example of an implementation of the present invention. As illustrated in FIG. 6, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to the side of the electronic device. However, in order to improve the effects of decorating the appearance of the electronic device, the connection line between the first location and the second location may be arranged at a certain angle to the side of the electronic device.

In an embodiment of the present invention, the body of the electronic device further comprises a processor and a sensor configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

As shown in FIG. 6, when the user does not want to hold the electronic device, the support part 4 is unfolded from the accommodating portion 2. The electronic device may be supported stably with the free end of the support part 4 being borne against the bearing device such as a desk 20. In the embodiment of the present invention, the support part 4 is in a foldable form, which has two portions connected by the pivot 41. After the support part 4 is unfolded, upon supporting the electronic device as required, a foldable portion of the support part 4 may abut against the desk 20 to increase the contact area between the support part 4 and the desk 20 so as to support the electronic device more stably.

Figure 7:
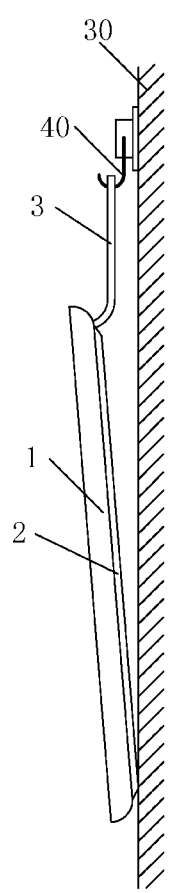
FIG. 7 is a schematic view showing an assembled structure of an electronic device according to a seventh example of an implementation of the present invention.

FIG. 7 is a schematic view showing an assembled structure of an electronic device according to a seventh example of an implementation of the present invention. As illustrated in FIG. 7, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to the side of the electronic device. However, in order to improve the effects of decorating the appearance of the electronic device, the connection line between the first location and the second location may be arranged at a certain angle to the side of the electronic device.

In an embodiment of the present invention, the body of the electronic device further comprises a processor and a sensor configured to obtain sensed parameters for determining the operational postures of the electronic device.

The processor is configured to control the electronic device to operate in a first working mode which is adapted to the first operational posture when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture when the electronic device is in the third operational posture, for example, a third display interface which is adapted to the third operational posture is displayed on the display screen, such as multi-person, multi-orientation interactive interfaces; or the system of the electronic device is switched to a mode of smart device.

As shown in FIG. 7, when the user does not want to hold the electronic device, the support part 4 is unfolded from the accommodating portion 2. The electronic device may be supported stably with the free end of the hanging part 3 hung at a hook 40 which is fixed on the wall 30. In the present embodiment, the support part 4 is in a foldable form, which has two portions connected by the pivot 41. After the support part 4 is unfolded, upon supporting the electronic device as required, a foldable portion of the support part 4 may abut against the desk 20 to increase the contact area between the support part 4 and the desk 20 so as to support the electronic device more stably.

Figure 8:
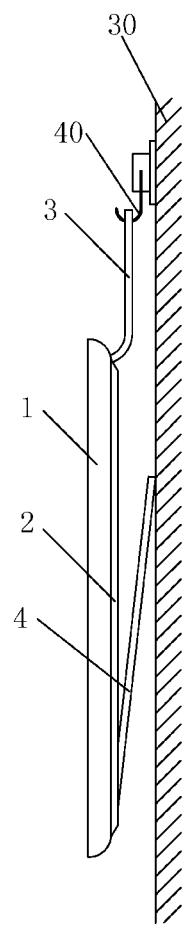
FIG. 8 is a schematic view showing an assembled structure of an electronic device according to an eighth example of an implementation of the present invention.

FIG. 8 is a schematic view showing an assembled structure of an electronic device according to an eighth example of an implementation of the present invention. As illustrated in FIG. 8, the electronic device according to the example comprises:

a body 1 comprising a display screen exposed on a first surface of the body;

a hanging part 3 arranged at a first location on a second surface of the body 1 by a first connecting member;

a support part 4 arranged at a second location on the second surface of the body by a second connecting member, wherein the electronic device is hung at a first bearing device such as a hook by the hanging part 3 and in a hung posture;

the electronic device is supported at a second bearing device by the support part 4 and in a support posture.

In the embodiments of the present invention, an accommodating portion which accommodates the hanging part and the support part is further provided on the second surface of the body of the electronic device. The accommodating portion is generally parallel to a connection line between the first location and the second location to allow the hanging part and the support part to be retracted easily.

As a preferred embodiment, the connection line between the first location and the second location is parallel to the side of the electronic device. However, in order to improve the effects of decorating the appearance of the electronic device, the connection line between the first location and the second location may be arranged at a certain angle to the side of the electronic device.

In an embodiment of the present invention, the body of the electronic device further comprises a processor and a sensor configured to obtain sensed parameters for determining the operational postures of the electronic device.

The processor is configured to control the electronic device to operate in a first working mode which is adapted to the first operational posture, when the electronic device is in the first operational posture, for example, a first display interface which is adapted to the first operational posture is displayed on the display screen, such as TV and VOD interfaces; or the system of the electronic device is switched to a mode of smart TV.

The processor is also configured to control the electronic device to operate in a second working mode which is adapted to the second operational posture, when the electronic device is in the second operational posture, for example, a second display interface which is adapted to the second operational posture is displayed on the display screen, such as windows standard interfaces; or the system of the electronic device is switched to a mode of windows.

The processor is also configured to control the electronic device to operate in a third working mode which is adapted to the third operational posture, when the electronic device is in the third operational posture, for example, a third display interface which is adapted to the third operational posture is displayed on the display screen, such as multi-person, multi-orientation interactive interfaces; or the system of the electronic device is switched to a mode of smart device.

As shown in FIG. 8, when the user does not want to hold the electronic device, the support part 4 is unfolded from the accommodating portion 2. The electronic device may be supported stably with the free end of the hanging part 3 hung at a hook 40 which is fixed on the wall 30. In the present embodiment, after the electronic device is hung at the hook 40, in order to facilitate the support of the electronic device, the support part 4 may be unfolded to make the support part 4 abut against the wall 30 to support the lower end of the electronic device such that the display screen of the electronic device is parallel to the wall 30. In this way, when the user watches the videos, the user experience will be improved.

In another implementation of the present invention, the operational posture switching unit may comprises a supporting member. The supporting member is connected to the body by a connector and is rotatable about the connector as a rotation center via the connector. In the first working position of the operational posture switching unit, the supporting member is rotated about the rotation center via the connector to a first predetermined angle and the electronic device is in the first operational posture. In the second working position of the operational posture switching unit, the supporting member is rotated about the rotation center via the connector to a second predetermined angle and the electronic device is in the second operational posture.

In another implementation of the present invention, the operational posture switching unit may achieve the switch of the operational postures of the electronic device by changing the rotation positions of the supporting member.

The above implementation may specifically comprise the following ninth to sixteen examples.

Example 9

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

In particular, the first operational posture is different from the second operational posture.

Herein, the electronic device may be TV, tablet PC or the like.

In this way, when the electronic device is used, by means of rotating the supporting member, the body of the electronic device may be in different operational postures, for example, the electronic device may be in the support operational posture, or in the hung operational posture such that the user can switch flexibly the operational postures in which the body of the electronic device is located within various environments. Such technical solution has a simple operation, high practicability and improves the user's experiences.

Example 10

Figure 9:
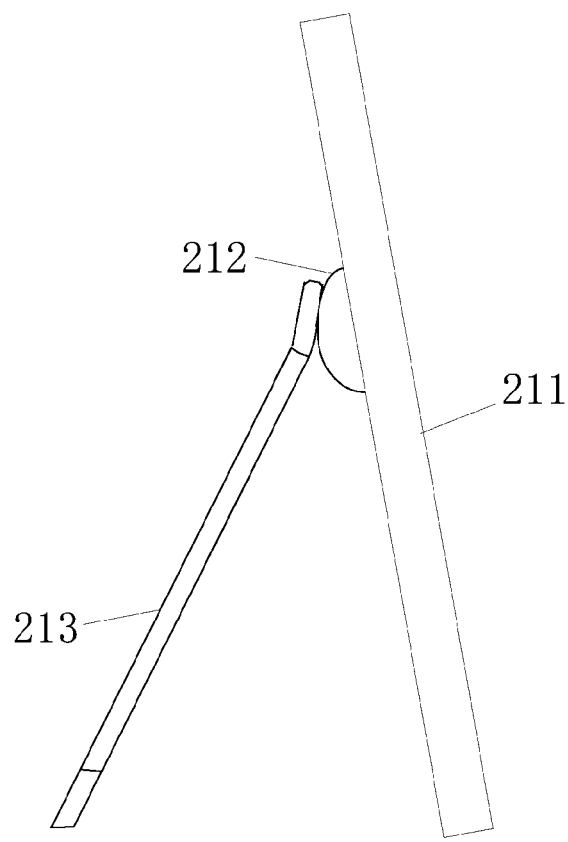
FIG. 9 is a first side schematic view of an electronic device according to another implementation of the present invention.

As illustrated in FIG. 9, the electronic device according to the present example comprises: a body 211, a connector 212 and a supporting member 213.

The body 211 comprises a display screen exposed on a first surface of the body 211.

The connector 212 is arranged on a second surface of the body 211, the second surface being opposite to the first surface.

The supporting member 213 is connected to the body 211 by the connector 212 and is rotatable about the connector 212 as a rotation center via the connector 212.

When the supporting member 213 is rotated about the rotation center via the connector 212 to a first predetermined angle, the electronic device is in the first operational posture.

When the supporting member 213 is rotated about the rotation center via the connector 212 to a second predetermined angle, the electronic device is in the second operational posture.

The first operational posture is different from the second operational posture.

In this way, when the electronic device is used, by means of rotating the supporting member, the body of the electronic device may be in different operational postures, for example, the support operational posture or the hung operational posture such that within various environments, the user can switch flexibly the operational postures in which the body of the electronic device is located. Such technical solution has a simple operation, high practicability and improves the user's experiences.

Preferably, the supporting member comprises a connecting part and a main part, and both of them form the shape of the supporting member.

The supporting member contacts with the second surface of the body completely when the supporting member is rotated about the rotation center via the connector to a first predetermined angle.

For instance, the shape of the supporting member formed by the connecting part and the main part may be L-like shape.

Figure 10:
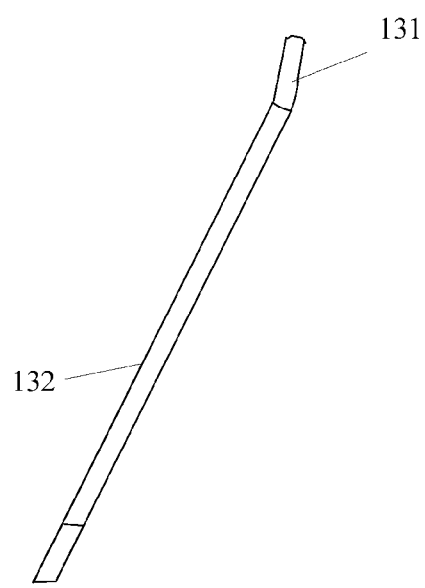
FIG. 10 is a first schematic view of a supporting member of the electronic device according to another implementation of the present invention.

Specifically, as shown in FIG. 10, when the supporting member 213 comprises the connecting part 131 and the main part 132, they form the shape of the supporting member.

When the supporting member 213 is rotated about the rotation center via the connector 212 to a first predetermined angle, the supporting member 213 is in contact with the second surface of the body 211 completely.

In FIG. 10, the shape of the supporting member 213 formed by the connecting part 131 and the main part 132 is similar to L-like shape.

Thereby, the supporting member may be rotated via the connector to adjust the operational posture of the electronic device and improve the user's experiences.

Figure 11:
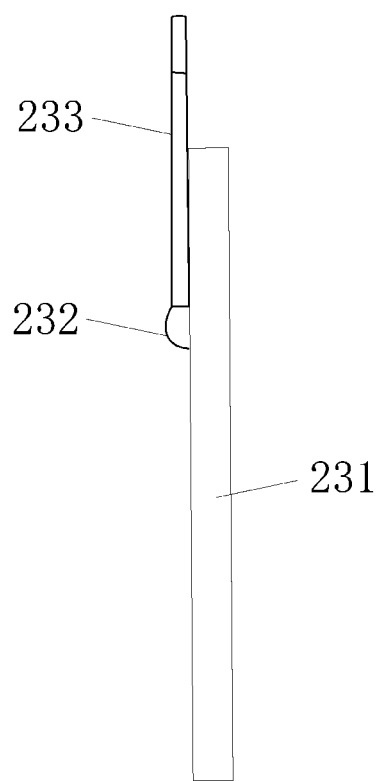
FIG. 11 is a second side schematic view of an electronic device according to another implementation of the present invention.

As illustrated in FIG. 11, when the supporting member 233 is rotated about the rotation center via the connector 232 to a first predetermined angle, the supporting member 233 is in contact with the second surface of the body 231 completely.

When the supporting member 233 is rotated about the rotation center via the connector 232 to a first predetermined angle, the electronic device is in the first operational posture.

Herein, when the electronic device is in the first operational posture, the first operational posture is the hung operational posture.

Herein, the electronic device may be hung at the hook or other components which project and may be used to hang objects. Of course, the supporting member of the electronic device may be caught or held by the hand.

In this way, upon using the electronic device, the user may allow the body of the electronic device to be in the hung operational posture by means of rotating the supporting member. It has a simple operation, high practicability and improves the user's experiences.

For instance, when doing exercises, the user may hang iPad easily at the treadmill, or the stepper. In this way, the user may listen to music and/or watch videos on iPad while he is doing exercises.

Example 11

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

Preferably, the body has a connecting boss, and the connecting boss has a first face on which the connector is arranged and which is connected to the connecting part of the supporting member by the connector.

Preferably, the first face of the connecting boss is arranged at an angle $\beta$ with respect to the second surface of the body, the angle $\beta$ being approximately equal to an angle $\alpha$ which is formed between the connecting part of the supporting member and the main part of the supporting member.

Figure 12:
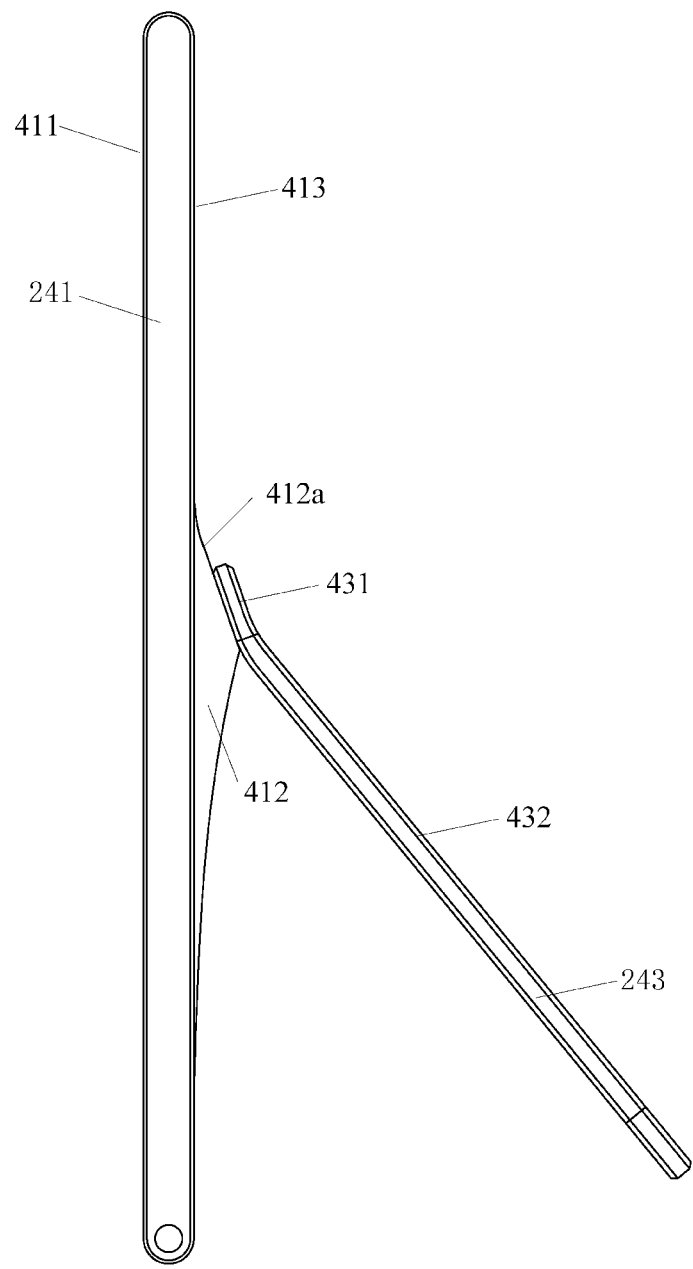
FIG. 12 is a third side schematic view of an electronic device according to another implementation of the present invention.
Figure 13:
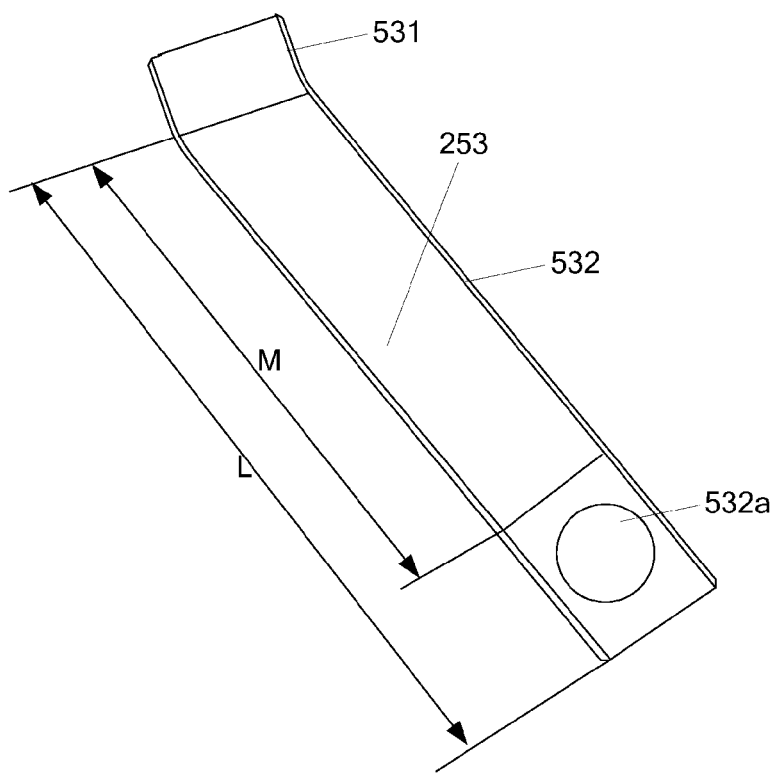
FIG. 13 is a second schematic view of a supporting member of the electronic device according to another implementation of the present invention.

As illustrated in FIG. 12, in addition to the display screen 411, the body 241 further comprises a connecting boss 412.

The connecting boss 412 has a first face 412a on which the connector 242 is arranged and which is connected to the connecting part 431 of the supporting member 243 by the connector 242.

The first face 412a of the connecting boss 412 is arranged at an angle $\beta$ with respect to the second surface 413 of the body 241, the angle $\beta$ being approximately equal to an angle $\alpha$ which is formed between the connecting part 431 of the supporting member 243 and the main part 432 of the supporting member 243.

Preferably, the angle $\beta$ is greater than 90 degrees.

In this way, when the electronic device is used, by means of rotating the supporting member, the body of the electronic device may be in the first operational posture or the second operational posture, for example, the support operational posture or the hung operational posture such that within various environments, the user can switch flexibly the operational postures in which the body of the electronic device is located. In particular, when the electronic device is in the second operational posture, for example the support operational posture, it can be supported more stably. In this circumstance, the angle of the electronic device supported by the supporting member is more suitable for the user to watch the display screen and the user's experiences are improved.

Example 12

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

Preferably, the supporting member comprises a connecting part and a main part which form the shape of the supporting member.

The supporting member contacts with the second surface of the body completely when the supporting member is rotated about the rotation center via the connector to a first predetermined angle.

Preferably, the main part of the supporting member has a hanging portion arranged at an end of the main part, the main part having a length L.

The length L of the main part is greater than a vertical distance from the first edge (the upper edge of the surface on which the supporting member is arranged in FIG. 11) of the second surface 413 to the intersection line of the first face 412*a* of the connecting boss 412 with the second surface 413, such that the hanging portion of the main part is exposed beyond the first edge of the second surface 413 of the body when the supporting member is rotated about the rotation center to the first predetermined angle via the connector and the electronic device is in the first operational posture.

As illustrated in FIG. 12, the main part 532 of the supporting member 253 has a hanging portion 532*a* arranged at an end of the main part 532, the main part having a length L.

The length L of the main part 532 is greater than a vertical distance from the first edge (the upper edge of the surface on which the supporting member is arranged in FIG. 11) of the second surface 413 to the intersection line of the first face 412*a* of the connecting boss 412 with the second surface 413 of the body, such that the hanging portion 532*a* of the main part is exposed beyond a second edge of the second surface of the body when the supporting member is rotated about the rotation center to the first predetermined angle via the connector and the electronic device is in the first operational posture.

As a preferable implementation, the length M of the main part 532 is equal to the vertical distance from the first edge (the upper edge of the surface on which the supporting member is arranged in FIG. 11) of the second surface 413 to the intersection line of the first face 412*a* of the connecting boss 412 with the second surface 413 of the body, such that the hanging portion 532*a* of the main part is just completely exposed with respect to the first edge of the second surface of the body when the supporting member is rotated about the rotation center to the first predetermined angle via the connector and the electronic device is in the first operational posture.

Figure 14:
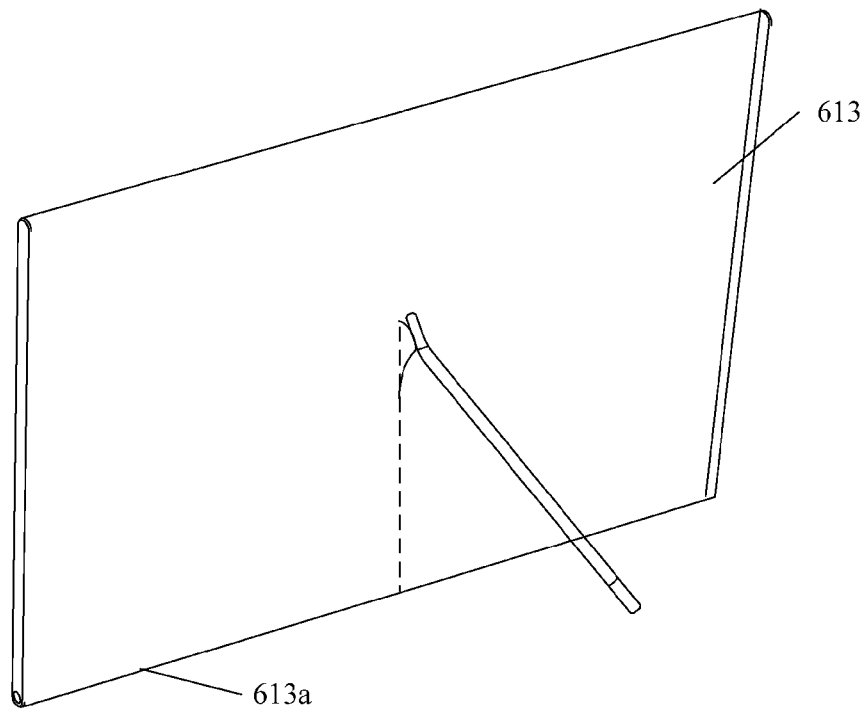
FIG. 14 is a side schematic view of the back of the electronic device according to another implementation of the present invention.

In FIG. 14, the second surface of the body is marked by a reference number 613 in a side rear view and the second edge (the lower edge of the surface on which the supporting member is arranged in figure) of the second surface is marked by a reference number 613*a* in a side rear view, the dash indicating the vertical distance from the second edge of the second surface to the intersection line of the first face of the connecting boss with the second surface. When the electronic device is in the second operational posture, the second edge of the second surface and the free end of the hanging portion of the supporting member are located substantially in the same plane, that is, the projected length of the main part 532 with the length L on the second surface is substantially equal to the vertical distance from the second edge of the second surface to the intersection line of the first face of the connecting boss with the second surface as indicated by the dash. Or, the angle between the supporting member and the second surface in the second operational posture may be adjusted such that the second edge of the second surface and the free end of the hanging portion of the supporting member are located substantially in the same plane.

In this way, when the electronic device is used, by means of rotating the supporting member, the body of the electronic device may be in the first operational posture or the second operational posture, for example, the support operational posture or the hung operational posture such that within various environments, the user can switch flexibly the operational postures in which the body of the electronic device is located, in particular, when the electronic device is in the second operational posture, for example the support operational posture. In this circumstance, the angle of the electronic device supported by the supporting member is more suitable for the user to watch the display screen and the user's experiences are improved.

Example 13

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

Preferably, the supporting member comprises a connecting part and a main part which form the shape of the supporting member.

The supporting member contacts with the second surface of the body completely when the supporting member is rotated about the rotation center via the connector to a first predetermined angle.

Preferably, the main part of the supporting member has a hanging portion arranged at an end of the main part, the main part having a length L.

The length L of the main part is greater than a vertical distance from the first edge of the second surface to the intersection line of the first face of the connecting boss with the second surface, such that the hanging portion of the main part is exposed beyond the first edge of the second surface of the body when the supporting member is rotated about the rotation center to the first predetermined angle via the connector and the electronic device is in the first operational posture.

Preferably, the hanging portion is provided with a hook or a ring.

In this way, the electronic device may be hung easily at a certain position. When the electronic device is used, by means of rotating the supporting member, the body of the electronic device may be in the first operational posture or the second operational posture, for example, the support operational posture or the hung operational posture such that within various environments, the user can switch flexibly the operational postures in which the body of the electronic device is located. In particular, when the electronic device is in the first operational posture, for example the hung operational posture, it is fixed more easily and the user's experiences are improved.

Example 14

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

Preferably, the body further comprises a sensor configured to obtain sensed parameters for determining the operational postures of the electronic device and/or a processor configured:

to control the electronic device to operate in a first working mode when the electronic device is in the first operational posture; and to control the electronic device to operate in a second working mode when the electronic device is in the second operational posture.

The first working mode is adapted to the first operational posture while the second working mode is adapted to the second operational posture.

For example, a first display interface is adapted to the first operational posture, for example, TV interface and Video On Demand interface. The second display interface is adapted to the second operational posture, for example, windows standard interface. When the sensor determines that the electronic device is in the first operational posture, the processor controls to switch the electronic device into the first display interface and switch the system of the electronic device into the mode of the smart TV. When the sensor determines that the electronic device is in the second operational posture, the processor controls to switch the electronic device into the second display interface and switch the system of the electronic device into the mode of windows.

Preferably, the sensor is used to detect the rotation angle of the supporting member about the rotation center.

For instance, the sensor may be a contact sensor, or a gravity sensor mounted at the location in which the connecting boss is provided, for obtaining the sensed parameters to determine the operational postures of the electronic device.

Specifically, the processor is configured to control the electronic device to operate in a first working mode when the sensor determines the electronic device to be in the first operational posture; otherwise, the processor is configured to control the electronic device to operate in a second working mode when the sensor determines the electronic device to be in the second operational posture.

In this way, the electronic device can be switched automatically into the corresponding interactive mode, after determining the operational posture in which the electronic device is currently located, thereby improving the user's experiences.

Example 15

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

Preferably, the supporting member comprises a connecting part and a main part which form the shape of the supporting member.

The supporting member contacts with the second surface of the body completely when the supporting member is rotated about the rotation center via the connector to a first predetermined angle.

Preferably, the supporting member is a linear type supporting member.

Preferably, the supporting member is made from at least one of metal materials, plastic materials and composite materials.

Preferably, the supporting member is hollow or solid.

In this way, it not only can save the production costs, but also keep the strength of the supporting member such that the electronic device can be switched reliably between its operational postures.

Example 16

The electronic device according to the present example comprises: a body, a connector and a supporting member.

The body comprises a display screen exposed on a first surface of the body.

The connector is arranged on a second surface of the body, the second surface being opposite to the first surface.

The supporting member is connected to the body by the connector and is rotatable about the connector as a rotation center via the connector.

When the supporting member is rotated about the rotation center via the connector to a first predetermined angle, the electronic device is in the first operational posture.

When the supporting member is rotated about the rotation center via the connector to a second predetermined angle, the electronic device is in the second operational posture.

Preferably, the supporting member comprises a connecting part and a main part which form the shape of the supporting member.

The supporting member contacts with the second surface of the body completely when the supporting member is rotated about the rotation center via the connector to a first predetermined angle.

Preferably, the body has a connecting boss, and the connecting boss has a first face on which the connector is arranged and which is connected to the connecting part of the supporting member by the connector.

Preferably, the first face of the connecting boss is arranged at an angle β with respect to the second surface of the body, the angle β being approximately equal to an angle α which is formed between the connecting part of the supporting member and the main part of the supporting member.

Preferably, the main part of the supporting member has a hanging portion arranged at an end of the main part, the main part having a length L.

The length L of the main part is greater than a vertical distance from the first edge of the second surface to the intersection line of the first face of the connecting boss with the second surface, such that the hanging portion of the main part is exposed beyond the first edge of the second surface of the body when the supporting member is rotated about the rotation center to the second predetermined angle via the connector and the electronic device is in the second operational posture.

Figure 15:
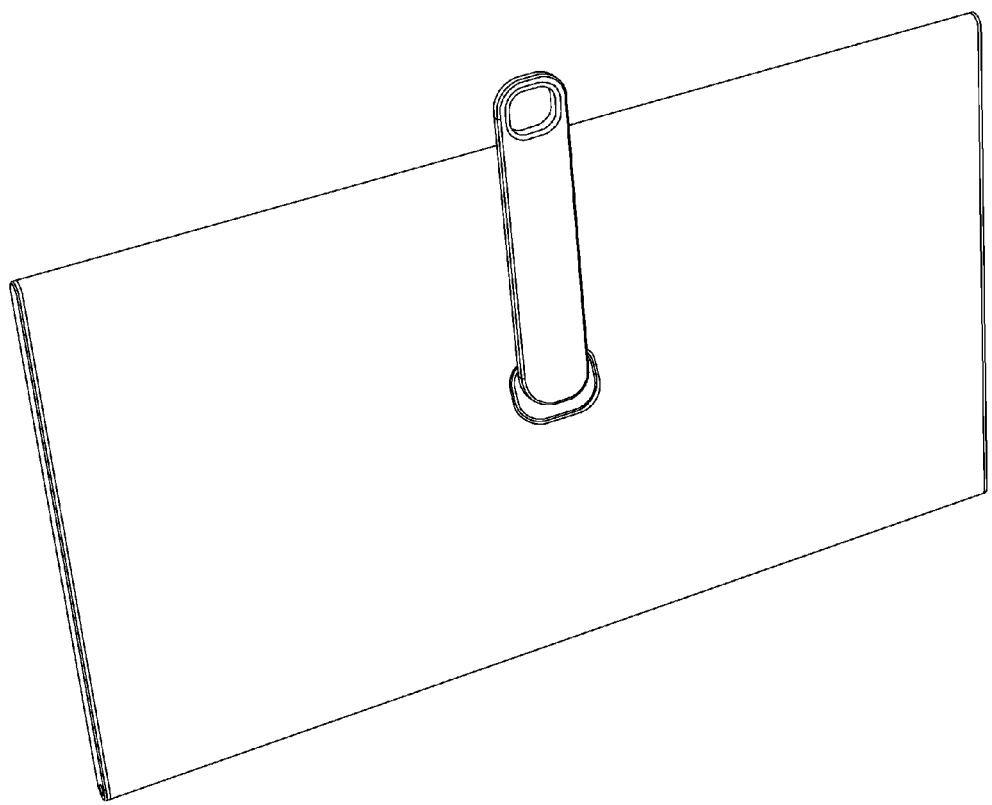
FIG. 15 is a first side schematic perspective view of the back of the electronic device according to another implementation of the present invention.

As shown in FIG. 15, when the supporting member is rotated about the rotation center via the connector to the first predetermined angle, the electronic device is in the first operational posture. In the first operational posture, the supporting member contacts with the second surface of the body completely. In this circumstance, the hanging portion of the main part is exposed beyond the first edge of the second surface of the body such that the electronic device can be hung by the hanging portion in the first operational posture.

In this way, the electronic device can be held more stably.

In the first operational posture, the electronic device may be hung at the hook.

For instance, in the train, the electronic device may be hung on the wall at the middle berth. Thus, the user can watch programs being played by the electronic device conveniently.

Again, for instance, upon moving the electronic device, the user may move it by catching or holding the supporting member of the electronic device by hand.

Figure 16:
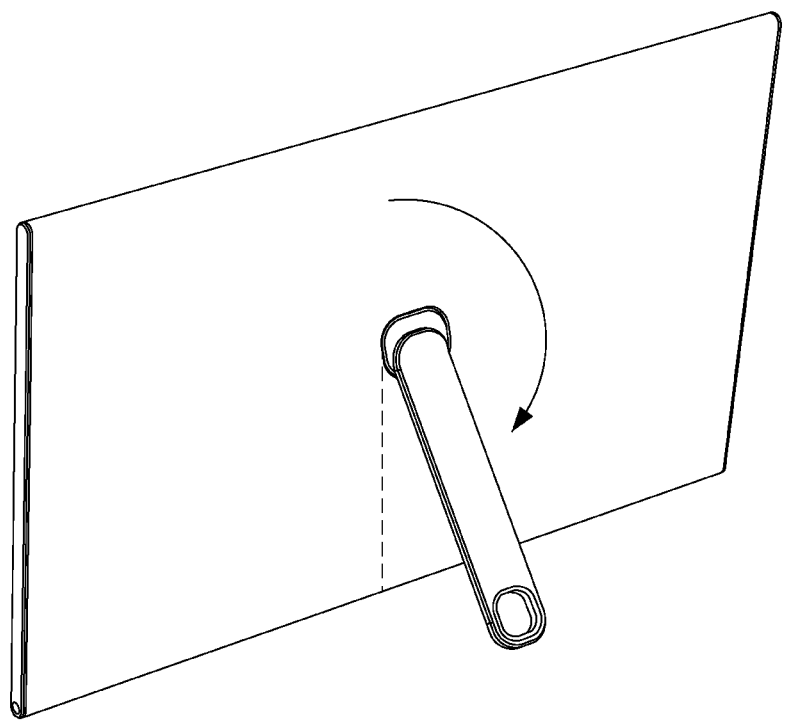
FIG. 16 is a second side schematic perspective view of the back of the electronic device according to another implementation of the present invention.

As illustrated in FIG. 16, when the supporting member is rotated about the rotation center to the second predetermined angle via the connector, the electronic device is in the second operational posture.

Obviously, the first operational posture is different from the second operational posture. And the second operational posture is more common.

Thus, the user may put the electronic device on a platform to appreciate the programs being played on the electronic device.

In this way, when the electronic device is used, the supporting member is rotated about the rotation center via the connector such that the body of the electronic device is in the support operational posture or in the hung operational posture. Thus, within various environments, the user can switch flexibly the operational postures in which the body of the electronic device is located. Such technical solution has a simple operation and improves the user's experiences.

Preferably, the body of the electronic device comprises a sensor configured to determine the operational posture of the electronic device and a processor configured to control the working mode in which the electronic device operates on basis of its operational posture.

For instance, when the sensor determines the electronic device to be in the first operational posture, the processor controls the electronic device to operate in the first working mode; otherwise, when the sensor determines the electronic device to be in the second operational posture, the processor controls the electronic device to operate in the second working mode.

For example, a first display interface is adapted to the first operational posture, for example, TV interface and Video On Demand interface. The second display interface is adapted to the second operational posture, for example, windows standard interface. When the sensor determines that the electronic device is in the first operational posture, the processor controls to switch the electronic device into the first display interface. When the sensor determines that the electronic device is in the second operational posture, the processor controls to switch the electronic device into the second display interface.

In this way, the electronic device can be switched automatically into the corresponding interactive mode after determining the operational posture in which the electronic device is currently operated. It has strong practicability, thereby improving the user's experiences.

In the above examples 11-14 and 16, the body has the connecting boss which may help the supporting member to be rotated and held to the desired working position such that the electronic device can be in different operational postures. Therefore, in this sense, the connecting boss may also be regarded as a part of the operational posture switching unit or as an assistant operational posture switching unit.

Any technical solutions disclosed in the above present embodiments may be combined without confliction.

In the above embodiments of the present invention, it is understood that the disclosed processes and smart devices may be implemented otherwise. The above embodiments are only illustrative. For example, the division of modules is only a division in terms of logical function. In practice, other divisions may also be possible, such as, a plurality of modules or assemblies may be combined or may be integrated into another system, or some features may be omitted or may not be carried out. Furthermore, the couplings, direct couplings or communication links between the respective components, as illustrated or discussed may be indirect couplings or communication links of the device or module via some interfaces, or may be electrical, mechanical or other forms.

The above modules described as separate components may or may not be separate in physics. The parts described as modules may or may not physical modules. That is, they may be in a certain location, or may be distributed on a plurality of network modules. Part or all of the modules may be selected as required to achieve the object of the embodiments of the present invention.

In addition, all of functional modules in the embodiments of the present invention may be integrated in one processing module. Each module may be used as a separate module, or two or more modules may be integrated in a single module. The above integrated module may be implemented in hardware, or may be implemented in a combination of hardware and software functional modules.

Although the specific embodiments of the present invention have been explained as above, the protection scope of the present invention is not limited to them. Any modifications and variations that are apparent to those skilled in the art by reading the disclosure in the present invention should What the claims is:
1. An electronic device, comprising:
a body comprising a display screen exposed on a first surface of the body;
a hanging part arranged at a first location on a second surface of the body by a first connecting member, the second surface being opposite to the first surface;
a support part arranged at a second location on the second surface of the body by a second connecting member,
wherein the electronic device has a first working position and a second working position and is switchable between the first working position and the second working position, and
wherein in the first working position of the electronic device, the electronic device is hung at a first bearing device by a first hole located on the hanging part, a second hole located on the support part receiving a fastener on the second surface and is in a first operational posture; and in the second working position of the electronic device, the electronic device is supported at a second bearing device by the support part, the first hole receiving the fastener and is in a second operational posture.

2. The electronic device as claimed in claim 1, wherein the electronic device further has a third working position, wherein the electronic device is in a third operational posture when the electronic device is located in the third working position.

3. The electronic device as claimed in claim 2, wherein when the hanging part and the support part are locked to each other, the electronic device is in the third operational posture.

4. The electronic device as claimed in claim 1, wherein the first location and the second location have same parameters, and when the hanging part and the support part are locked to each other, the locked hanging part and the locked support part form an appearance of the electronic device and are used as decoration parts in appearance.

5. The electronic device as claimed in claim 1, wherein
the hanging part is unfolded by the first connecting member to a first angle with respect to the body;
the support part is unfolded by the second connecting member to a second angle with respect to the body;
when the electronic device is in the first operational posture, the hanging part is located in a first relative position with respect to the body by the first connecting member while the support part is located in a second relative position with respect to the body by the second connecting member;
when the electronic device is in the second operational posture, the support part is located in a first relative position or the second relative position with respect to the body by the second connecting member, while the hanging part is located in a second relative position with respect to the body by the first connecting member;
wherein the first relative position in which the hanging part is located with respect to the body by the first connecting member is an unfolded position of the hanging part, and the second relative position in which the hanging part is located with respect to the body by the first connecting member is a retracted position of the hanging part;
wherein the first relative position in which the support part is located with respect to the body by the second connecting member is an unfolded position of the support part, and the second relative position in which the support part is located with respect to the body by the second connecting member is a retracted position of the support part.

6. The electronic device as claimed in claim 3, wherein the body of the electronic device further comprises:
a sensor configured to obtain sensed parameters for determining the operational postures of the electronic device and
a processor configured:
to control the electronic device to operate in a first working mode which is adapted to the first operational posture when the electronic device is in the first operational posture;
to control the electronic device to operate in a second working mode which is adapted to the second operational posture when the electronic device is in the second operational posture; and
to control the electronic device to operate in a third working mode which is adapted to the third operational posture when the electronic device is in the third operational posture.

7. The electronic device as claimed in claim 4, wherein
a first accommodating portion which corresponds to the first location and accommodates the hanging part, is provided on the second surface of the body; and
a second accommodating portion which corresponds to the second location and accommodates the support part, is provided on the second surface of the body,
wherein the first accommodating portion and the second accommodating portion are formed integrally.

8. The electronic device as claimed in claim 7,
wherein when the hanging part and the support part are accommodated in the first accommodating portion and the second accommodating portion respectively, the hanging part and the support part are locked and connected to each other;
wherein the circumstance that the hanging part and the support part are locked and connected to each other comprises:
the hanging part and the support part are connected by a button and an eye, or
the hanging part and the support part are connected by a slot and a clasp, or
the hanging part and the support part are connected by a screw and a nut.

9. The electronic device as claimed in claim 7, wherein, the support part comprises a second pivot and a supporter to support the terminal, wherein the supporter is connected to the second pivot and rotatable about it, the supporter being a linear type supporter, a double folded type supporter or a triangular type supporter.

10. The electronic device as claimed in claim 9, wherein, the double folded type supporter is folded to form the linear type supporter;
the triangular type supporter is folded to form the double folded type supporter or the linear type supporter.

11. The electronic device as claimed in claim 1, wherein, the operational posture switching unit comprises a supporting member,
wherein the supporting member is connected to the body by the connector and is rotatable about the connector as a rotation center via the connector; and wherein in the first working position of the operational posture switching unit, the supporting member is rotated about the rotation center via the connector to a first predetermined angle and the electronic device is in the first operational posture;

in the second working position of the operational posture switching unit, the supporting member is rotated about the rotation center via the connector to a second predetermined angle and the electronic device is in the second operational posture.

12. The electronic device as claimed in claim 11, wherein, the supporting member comprises a connecting part and a main part which form the shape of the supporting member, wherein the supporting member contacts with the second surface of the body completely when the supporting member is rotated about the rotation center via the connector to the first predetermined angle.

13. The electronic device as claimed in claim 12, wherein, the body has a connecting boss, wherein the connecting boss has a first face on which the connector is arranged and which is connected to the connecting part of the supporting member by the connector; and wherein the first face of the connecting boss is arranged at an angle β with respect to the second surface of the body, the angle β being approximately equal to an angle α which is formed between the connecting part of the supporting member and the main part of the supporting member.

14. The electronic device as claimed in claim 13, wherein, the main part of the supporting member has a hanging portion arranged at an end of the main part, the main part having a length L;

wherein the length L of the main part is greater than a vertical distance from a first edge of the second surface to an intersection line of the first face of the connecting boss with the second surface thereof, such that the hanging portion of the main part is exposed beyond the first edge of the second surface of the body when the supporting member is rotated about the rotation center to the second predetermined angle via the connector and the electronic device is in the second operational posture.

15. The electronic device as claimed in claim 11, wherein, the body further comprises:

a sensor configured to obtain sensed parameters for determining the operational postures of the electronic device; and/or a processor configured:
to control the electronic device to operate in a first working mode when the electronic device is in the first operational posture;
to control the electronic device to operate in a second working mode when the electronic device is in the second operational posture.

16. The electronic device as claimed in claim 13, wherein, the angle β is greater than 90 degrees.

17. The electronic device as claimed in claim 14, wherein, the hanging portion is provided with a hook or a ring.

* * * * *